(No Model.)
F. D. CABLE.
CHAIN ADJUSTMENT.
No. 494,804. Patented Apr. 4, 1893.
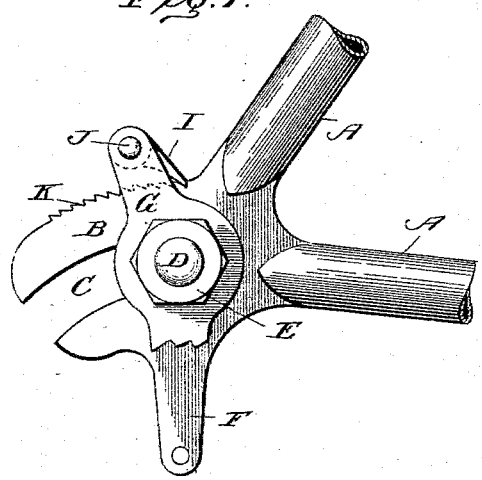
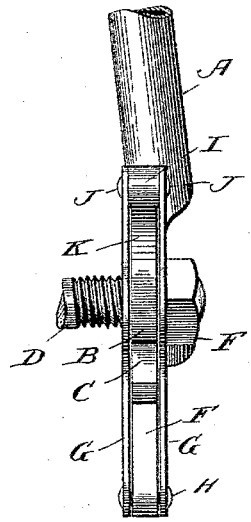
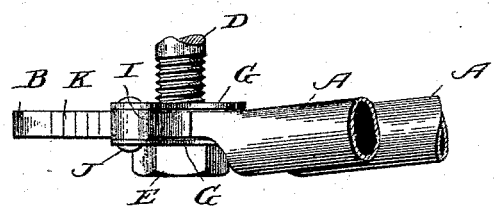
Witnesses
Edwin L. Bradford
Curtis Lammond
Frank D. Cable
Inventor
By Wm C. McIntire
his Attorney

UNITED STATES PATENT OFFICE.

FRANK D. CABLE, OF TOLEDO, OHIO, ASSIGNOR TO THE YOST MANUFACTURING COMPANY, OF SAME PLACE.

CHAIN ADJUSTMENT.

SPECIFICATION forming part of Letters Patent No. 494,804, dated April 4, 1893.

Application filed January 5, 1893. Serial No. 457,360. (No model.)

*To all whom it may concern:*

Be it known that I, FRANK D. CABLE, a citizen of the United States, residing at Toledo, in the county of Lucas and State of Ohio, have invented certain new and useful Improvements in Chain Adjustments for Bicycles; and I do hereby declare the following to be a full, clear, and exact description of the invention, such as will enable others skilled in the art to which it appertains to make and use the same.

My invention relates to certain new and useful improvements in adjustment devices for bicycles, and particularly to that class known as rear adjustments.

It has for its object simplicity of construction, coupled with durability and rapid utilization, and with these ends in view my invention consists of the details of construction and arrangement hereinafter fully described and claimed.

In order that those skilled in the art may fully understand my invention I will proceed to describe the construction and operation of the same referring by letters of reference to the accompanying drawings in which—

Figure 1 is a side elevation of the rear wheel bracket and short sections of tubes or frame, and with my improved adjusting devices attached. Fig. 2 is a rear elevation of the same; and Fig. 3 is a top or plan view.

Similar letters of reference denote like parts in the several figures.

A represents the tubes constituting the frame, and to which is brazed the rear wheel bracket B which is formed with an arc-shaped slot C to receive the rear wheel axle D. The axle D is screw threaded at the ends, and is clamped in any predetermined position within the slot C by check nuts E. The bracket B is formed with a vertical extension or leg F to the lower end of which are pivoted two adjusting plates G, by a bolt or pivot H. The upper ends of these plates embrace a pawl I which is pivoted at J above the bracket B, the upper face of the latter being serrated or formed with a rack K, as most clearly shown at Fig. 1. The axle D of the rear wheel passes through the plates G, G, and takes its bearing therein, and the arc-shaped slot C is described from the pivot H as its center.

The operation of the devices is as follows: To tighten the sprocket wheel chain, which of course passes around the sprocket wheel on the rear axle D, the check nuts E are loosened and the axle drawn backward in the arc-shaped slot C, to any desired distance, the plates G vibrating upon the pivot H, and the pawl I falling into the rack K prevents the return of the adjusting plates in an obvious manner, whereupon the axle check nuts E are tightened and the axle held firmly in its adjusted position, thus relieving the pawl I of most of the strain thereon, and holding the chain against becoming loose except by natural wear.

In the drawings I have only shown one side of the frame, but it will be understood that the other side is similarly constructed, so that both ends of the axle may be properly adjusted.

What I claim as new, and desire to secure by Letters Patent, is—

In combination with the rear bracket B, formed with the arc-shaped slot C, rack K and vertical leg F, the vibrating plates G, pivoted to the lower extremity of the leg F, having pivoted between their upper ends a swinging pawl I, and adapted to receive the axle, substantially as and for the purpose set forth.

In testimony whereof I affix my signature in presence of two witnesses.

FRANK D. CABLE.

Witnesses:
 W. J. STRONG,
 JOHN RIDLEY.